INVENTORS
ANTONIO PACCIARINI
RENATO CARETTA

INVENTORS
ANTONIO PACCIARINI
RENATO CARETTA

INVENTORS
ANTONIO PACCIARINI
RENATO CARETTA

United States Patent Office 3,576,693
Patented Apr. 27, 1971

3,576,693
TIRE BUILDING DRUM ASSEMBLY
Antonio Pacciarini, Milan, and Renato Caretta, Gallarate, Italy, assignors to Pirelli S.p.A., Milan, Italy
Filed Dec. 15, 1967, Ser. No. 691,060
Claims priority, application Italy, Dec. 22, 1966, 31,404/66
Int. Cl. B29h 17/16
U.S. Cl. 156—417
11 Claims

ABSTRACT OF THE DISCLOSURE

A rigid collapsible drum assembly including a plurality of arcuate sectors disposed about a rotatable shaft and means to displace said sectors radially with respect to said shaft, the amount of displacement and the arcuate length of the sectors being such that a continuous outer surface is formed by the sectors in their outermost radial position and in their innermost radial position.

BACKGROUND OF THE INVENTION (1) Field of the invention

The present invention relates to a collapsible drum assembly for the manufacture of pneumatic tires and, more particularly, to such an assembly in which a plurality of rigid arcuate sectors are provided which are adapted to take two different positions, with the outer surface of the drum remaining continuous in each of the positions.

(2) Description of the prior art

Tire building drums having a plurality of rigid sectors adapted to take two different positions are generally known. In these arrangements the outer surface of the drum is continuous, and the drum can take a greater diameter during the building up operation, and a smaller diameter when the carcass or the finished tire is removed from the drum, and when the plies are applied to the carcass.

In such drums, however, it is often impossible to insure that the sectors reach the position corresponding to the maximum pre-established diameter, and that their outer surface be perfectly round, especially after a certain period of service. This is largely due to the wear of some components of the associated apparatus controlling the collapse and the expansion of the drum, such as, for example, the pivots and bushings.

Another serious drawback of the known drums is that the replacement of the sectors with other sectors having the same size is very difficult. Also, when it is desired to build up tires on the same drum which have a different bead diameter and/or carcass development between the tire beads, the replacement of the sectors with other sectors having a different size is often impossible.

SUMMARY OF THE INVENTION

The object of the present invention is a drum of the above-indicated type which is provided with means adapted to insure, at any moment, a constant value of the maximum diameter of its outer surface during the whole building operation, and also after a long period of service.

A further feature of the present invention is the provision of rendering the replacement of the sectors which define the outer surface of the drum simple and expeditious, particularly with sectors of different sizes so that the drum can be used for building up tires having a different bead diameter and/or carcass development between the tire beads.

BRIEF DESCRIPTION OF THE DRAWINGS

These and other features of the present invention will be more clearly understood from the following description, made with reference to the attached drawings, which illustrate, by way of example, an embodiment of a drum assembly in accordance with the invention. In the drawings.

DESCRIPTION OF THE PREFERRED EMBODIMENTS

Figure 1:
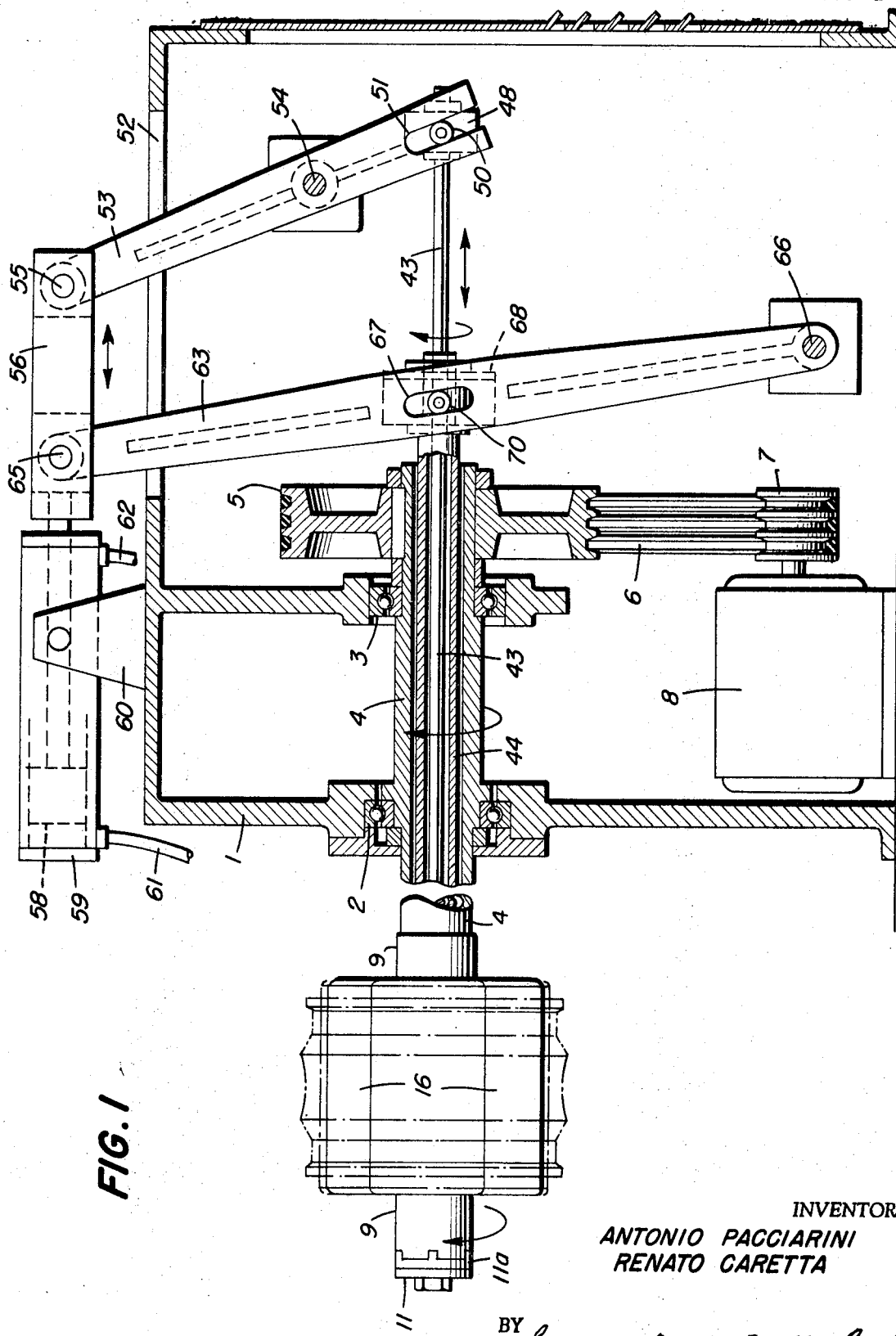
FIG. 1 is a side elevation, partly in section of the tire building drum assembly of the present invention, with the drum shown in its collapsed position in solid lines and in expanded position, with a tire carcass on it, in dot-dash lines.

Referring specifically to FIG. 1 of the drawings, the reference numeral 4 refers to a hollow mandrel which is assembled on a frame 1 by means of bearings 2 and 3. A pulley 5 is keyed to one end of the mandrel 4 and is connected by means of a belt drive 6 to a pulley 7 mounted on the shaft of a motor and speed reducer 8 for driving the tire building drum D mounted on the mandrel 4 in either a clockwise or counter-clockwise direction.

Figure 2:
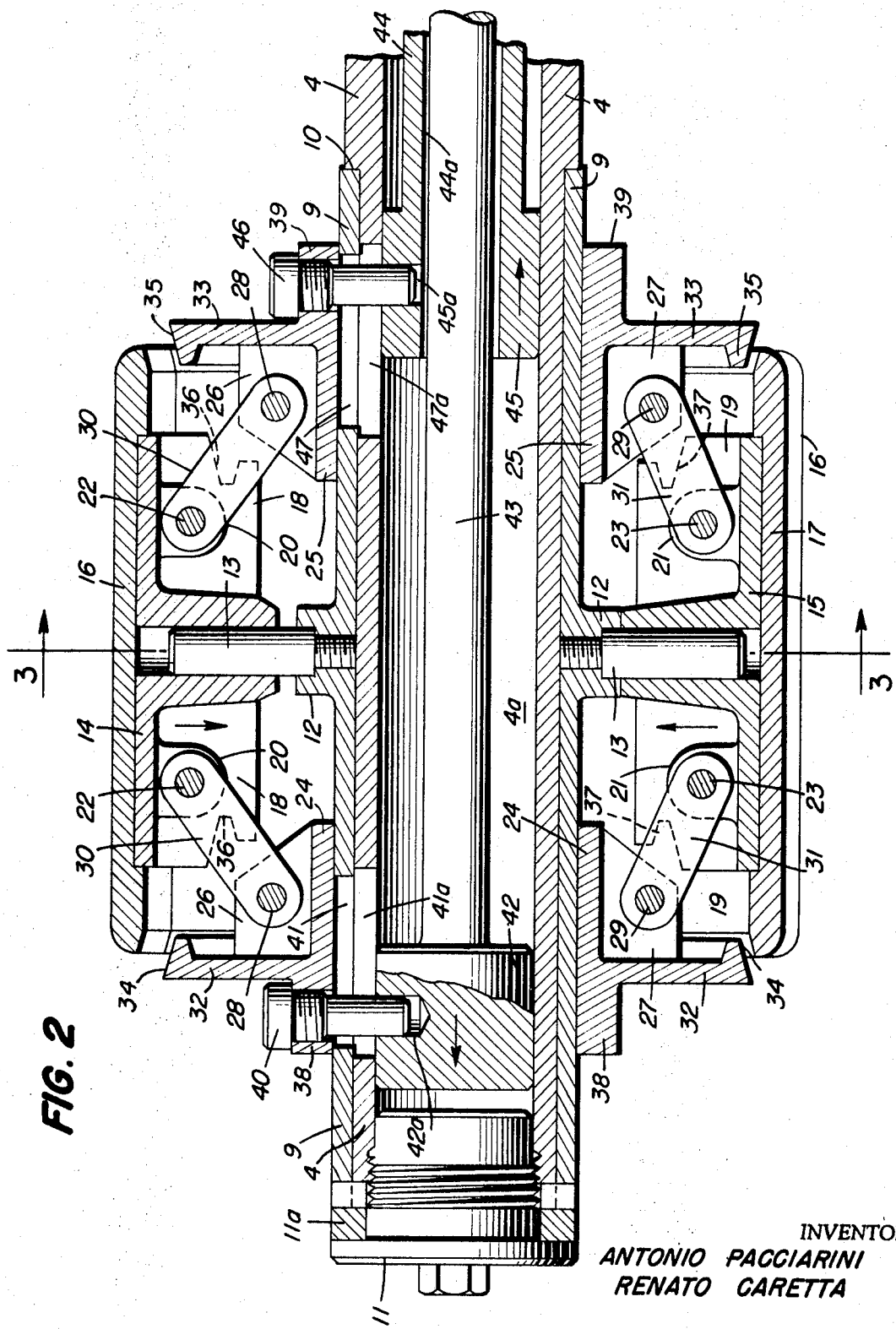
FIG. 2 is a vertical longitudinal sectional view of the drum in its collapsed position.

A sleeve 9 is inserted on the other end of the mandrel 4, and abuts against a shoulder 10 formed thereon. As seen in FIG. 2, sleeve 9 is secured against axial or radial movement relative to mandrel 4 by means of shoulder 10, keying member 11a and screw plug 11 which is threaded into the end of mandrel 4.

Figure 3:
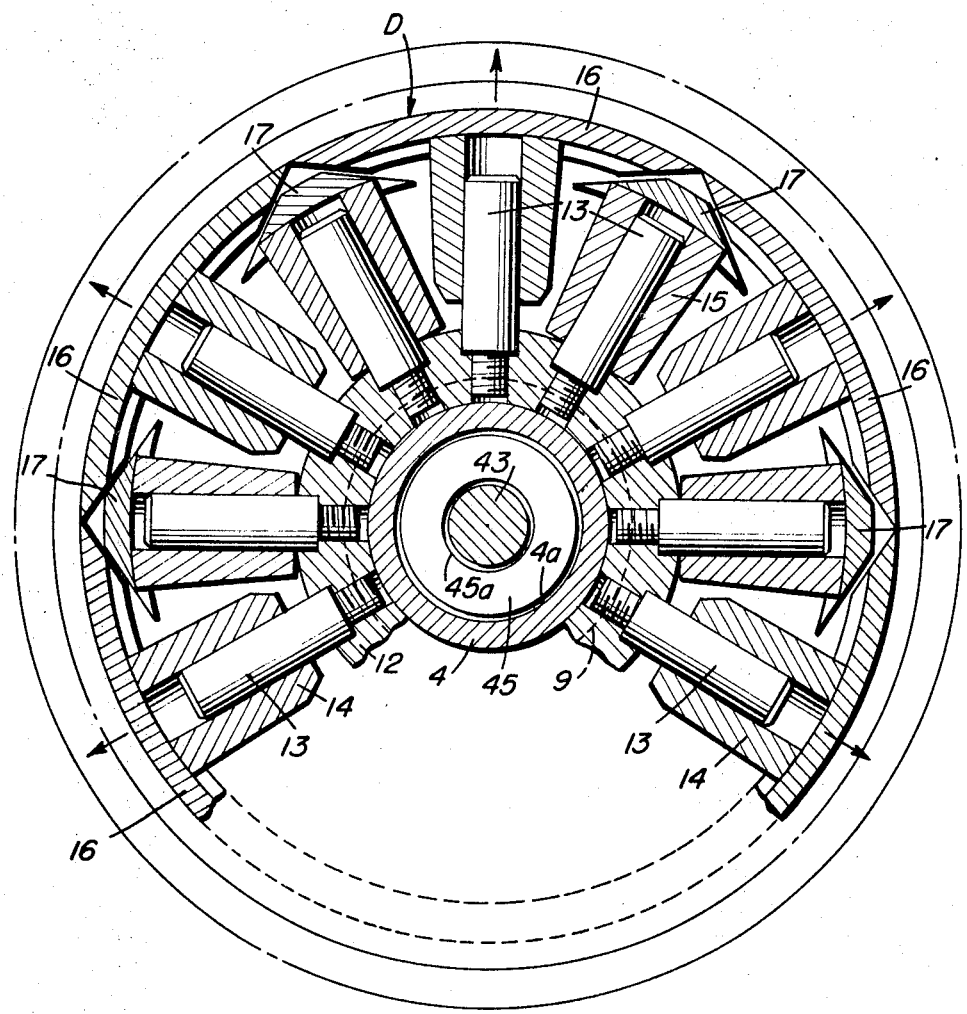
FIG. 3 is a vertical transverse sectional view taken along lines of 3—3 of FIG. 2.

As better shown in FIG. 3, a set of radial guide pins 13 are screwed into an annular flange 12 extending around sleeve 9. A plurality of drum sector supports 14 and 15 are slidably mounted on guide pins 13 and are fixed to a plurality of rigid sectors 16 and 17 forming the surface of a rigid collapsible drum.

Figure 5:
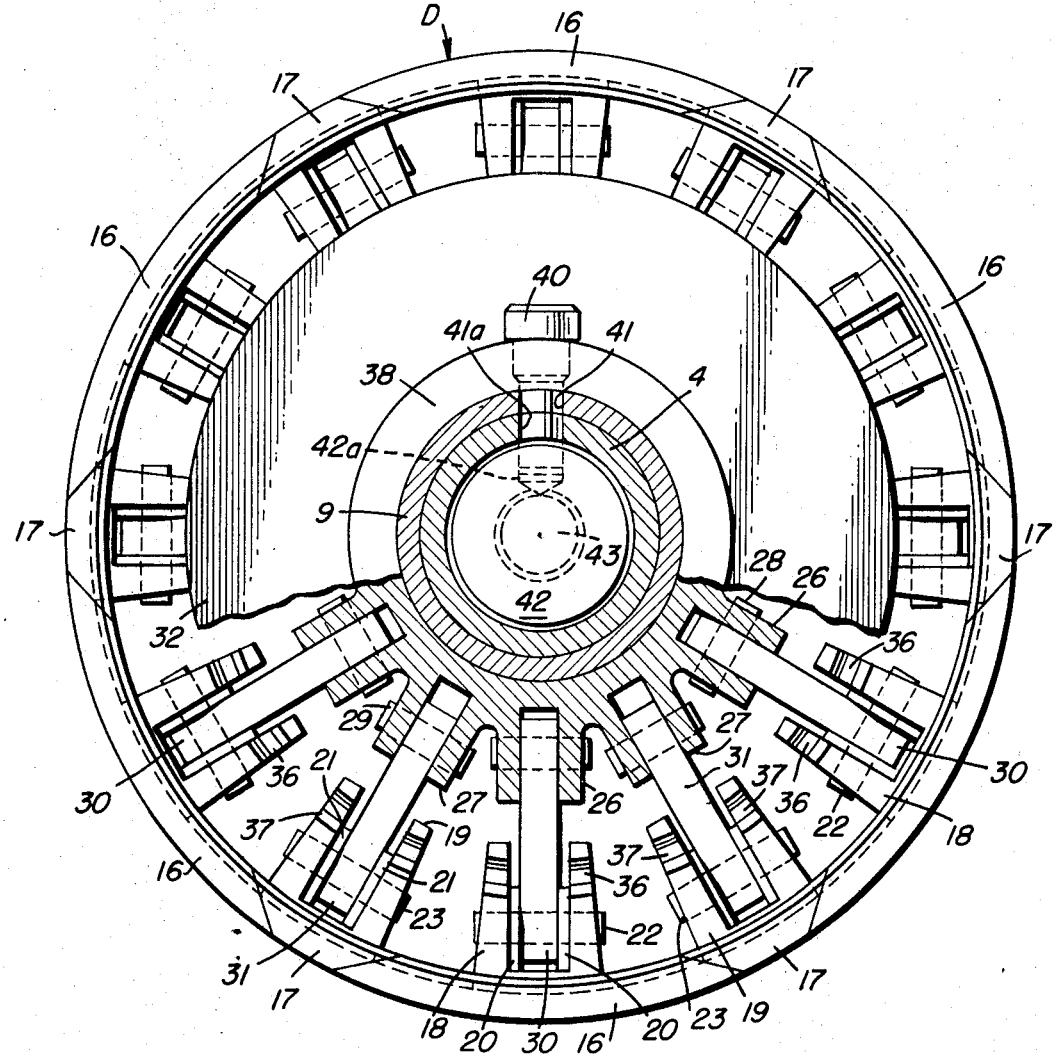
FIG. 5 is a vertical transverse sectional view taken on line 5—5 of FIG. 4.

Drum sector supports 14 and 15 are provided with bifurcated brackets 18 and 19, respectively, said brackets having corresponding, oppositely facing bosses 20 and 21 to which connecting links 30 and 31 are pivotally secured by pins 22 and 23, respectively, as better shown in FIGS. 2 and 5.

A pair of hubs 24 and 25 are slidably assembled on sleeve 9 and are provided with radially disposed bifurcated brackets 26 and 27 to which the inner ends of links 30 and 31 are pivotally secured by pins 28 and 29, respectively, the distance between each pair of pins 22 and 28 associated with links 30 being greater than the distance between each pair of pins 23 and 29 associated with links 31.

Circular flanges 32 and 33 are integral with the hubs 24, 25, respectively, and are provided at their rims with annular adjusting bosses 34, 35, respectively, having frusto-conical surfaces directed towards the drum midline. Recesses 36 and 37 are formed in brackets 18 and 19, respectively, oppositely facing and corresponding in shape to the adjusting bosses 34 and 35. As will be discussed in greater detail later, the adjusting bosses engage their corresponding recesses when the drum expands.

A stud screw 40 is threaded into hub extension 38 of hub 24, and extends radially through slots 41 and 41a formed in sleeve 9, and mandrel 4, respectively, and into a hole 42a in flange 42 formed on the end of shaft 43, flange 42 being slidably assembled in central bore 4a of mandrel 4.

Similarly, a stud screw 46 is threaded into hub extension 39 of hub 25, and extends radially through slots 47 and 47a formed in sleeve 9 and mandrel 4, respectively, and into a hole 45a in flange 45 formed on the end of mandrel 44. Flange 45 is also slidable in bore 4a and shaft 43 slidably passes through a central bore 44a of mandrel 44.

This arrangement allows relative opposite reciprocal movement of the mandrel 44 and shaft 43 inside mandrel 4 which will be explained in greater detail later, while also providing a positive key to the hubs 24 and 25 through the studs 40 and 46.

Referring again to FIG. 1, a journal box 48 is mounted on the end of shaft 43 opposite the flange 42 thereof, and a journal box 68 is mounted on the end of mandrel 44 opposite the flange 45 thereof in a manner to allow rotational motion of shaft 43 and mandrel 44, while transmitting reciprocal movement thereto as will be explained in greater detail later. This mounting of journal boxes 48 and 68 on shaft 43 and mandrel 44, respectively, can be effected by making the shaft and mandrel stepped and by utilizing a nut secured to the ends thereof, or the like.

A double acting hydraulic cylinder 59 is supported by a support 60 on frame 1, and is provided with conduits 61 and 62 for the admission and the discharge of pressurized fluid.

Lever means 53 and 63 are pivotally mounted at 55 and 65, respectively, in a yoke member 56 attached to the end of the piston 58 of cylinder 59, and the lever means extends through a slot 52 in frame 1.

Lever means 53 is pivoted at 54 on frame 1 and the end adjacent journal box 48 is formed with a pair of slits 51 extending to either side of shaft 43, only one of said slits being shown in FIG. 1. Rollers 50 are rotatably mounted on journal box 48 and slidably engage slits 51. Therefore, reciprocal movement of piston 58 causes reciprocal movement of shaft 43 through lever means 53.

The other end of lever means 63 is pivoted at 66 on frame 1 and has a pair of slits 67 formed in the central portion thereof and extending on either side of mandrel 44, only one slit being shown in FIG. 1. Slits 67 slidably engage rollers 70 carried by journal box 68 so that reciprocal movement of piston 58 causes a reciprocal movement of mandrel 44 in an opposite direction from that of shaft 43.

It is to be understood that the lever means may take any convenient form. For example, they could each consist of two lever members fixed to each other by means of a stiffening plate or the like.

Figure 4:
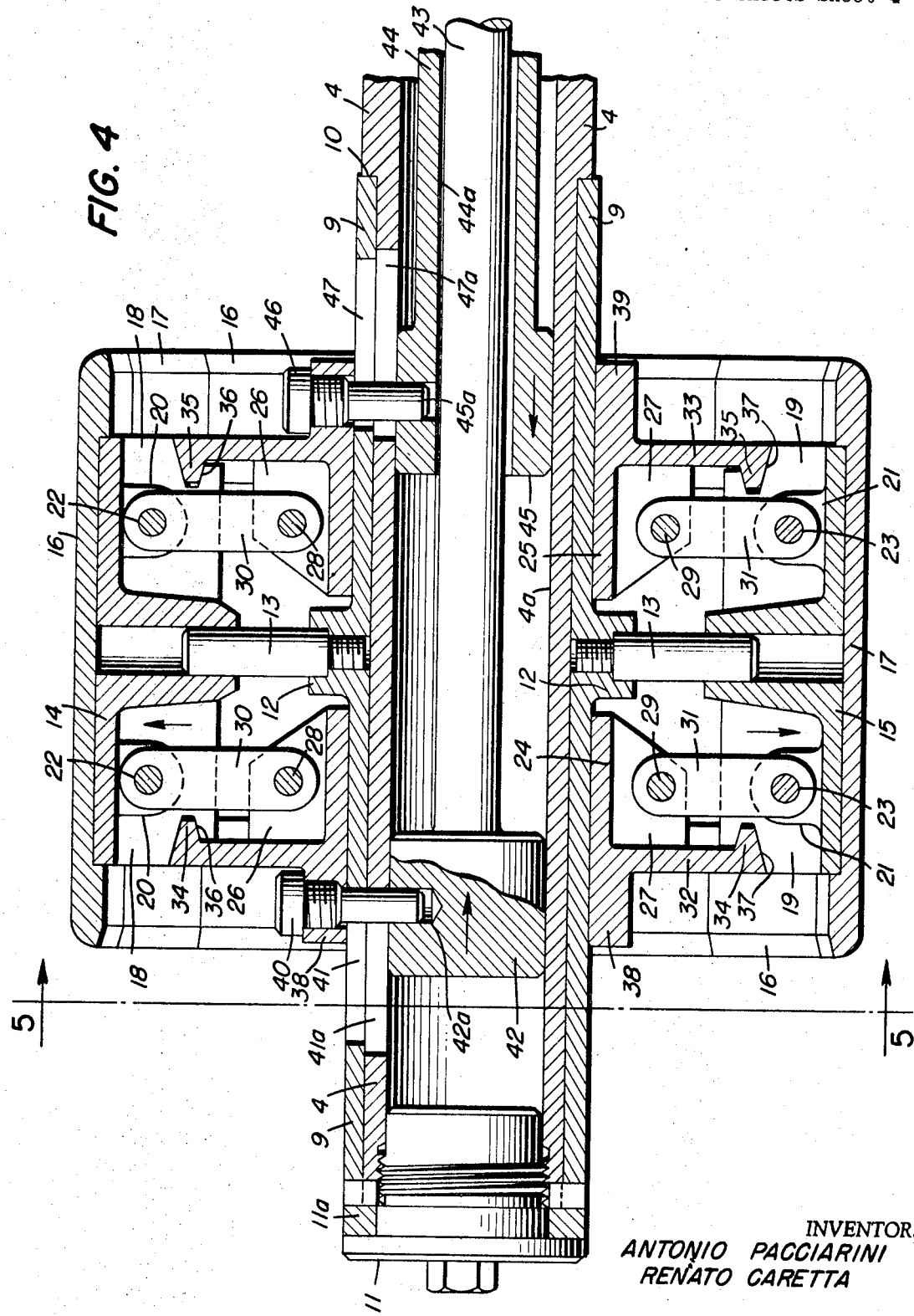
FIG. 4 is a vertical longitudinal sectional view of the drum in its expanded position.

To cause the drum to collapse from the expanded condition of FIGS. 4 and 5 to the condition shown in FIGS. 2 and 3, pressurized fluid is admitted to the cylinder 59 through the conduit 61 thus causing the upper ends of lever means 53 and 63 to be displaced to the right as shown in FIG. 1. This causes an axial displacement of the hollow mandrel 44 to the right and an axial displacement of shaft 43 to the left. Stud bolts 40 and 46 are thus displaced symmetrically in opposite directions with respect to the drum midline which causes a longitudinal displacement of the pins 28 and 29 outwardly from the midline of the drum, causing links 30 and 31 to assume the angular position seen in FIG. 2, and, simultaneously the disengagement of the adjusting bosses 34 and 35 from their respective recesses 36 and 37 in brackets 18 and 19. The result is a centripetal displacement of the sectors 16 and 17 guided by the radial pins 13.

Since the distance between the pins 22 and 28 on which the links 30 are pivoted is greater than the distance between the pins 23 and 29, on which the links 31 are pivoted, the above displacement will cause a centripetal displacement of sectors 17 which is greater than that for sectors 16. Also, the distance between the pins 22 and 28 and between the pins 23 and 29, as well as the arcuate length of the sectors is calculated so that the sectors 16, for a pre-established axial displacement of the shaft 43, after the collapse of the drum, come into mutual contact along their lateral edges, which is, of course, radially outward from sectors 17, as may be seen in FIG. 3. Thus, it is possible to obtain a continuous surface formed exclusively of sectors 16.

To return the drum to its expanded condition as seen in FIGS. 4 and 5, the above-described operations are carried out according to an inverted succession. It should be particularly noted with reference to these latter figures, that due to the engagement of the adjusting bosses 34 and 35 in their corresponding recesses 36 and 37, the sectors 16 and 17 are fixed in their expanded position to form a true smooth cylindrical surface which can be maintained for the required period of service.

To rotate the drum in either direction, the motor and speed reducer 8 is actuated, which, through pulleys 7 and 5 connected to the belt drive 6, sets the stud bolts 40 and 46 into rotation, as well as hubs 24 and 25 and the remaining components connected therewith.

The above-described drum possesses considerable advantages with respect to the conventional drums. For example, the adjusting bosses 34 and 35 insure that their corresponding links 30 and 31 reach the correct position of greatest expansion of sectors 16 and 17. Also, the links are prevented from moving away from this position during the building up of the tire, thus insuring a uniformity in the tires.

Further, in the event the pins 22, 28, 23 and 29 which accommodate the links should wear during the drum service, the adjusting bosses 34 and 35 would still bring the sectors to their pre-established position, in spite of the variance in clearance between the pins and the links.

A further advantage of the present invention is the possibility of replacing worn sectors by simply removing pins 22 and 23.

Further, if the sectors are to be replaced by sectors of different size, in the event the drum is to be used for building up tires having a different carcass development between the tire beads, the above simple replacement is also possible.

Finally, if the drum is to be used for building up tires having a different head diameter, it is, at the most, necessary to replace the existing links with other links of different lengths, the operation otherwise being the same as in replacing the sectors as discussed above.

Of course, variations of the specific construction and arrangement of this type drum herein disclosed can be made by those skilled in the art without departing from the invention as defined in the appended claims.

We claim:

1. A rigid collapsible drum assembly for building up pneumatic tires, said assembly comprising a rotatable axial shaft, a plurality of circular sectors defining the outer surface of said drum, means for supporting said sectors about said shaft and for displacing them radially in both directions with respect to said shaft and retaining said sectors within the operative plane of the drum, means for axially displacing said sector support and displacing means simultaneously and equally along the said shaft toward and away from the drum midline and within the operative plane of the drum, said sector support and displacing means each having two spaced radial extensions extending towards said shaft, each of said extensions having a seat formed therein, means on said axially displacing means to engage each of said seats when said sectors are brought to their radially outermost position and to disengage from said seats when the sectors are displaced radially inwardly towards the drum shaft in response to the movement of said axially displacing means, and means for rotating said drum about its axis.

2. A drum assembly as in claim 1, further comprising a plurality of radial guides for said sectors, each sector being slidably inserted on one of said guides, said guides being operatively connected to said sector support and displacing means.

3. A drum assembly as in claim 1, wherein said plurality of sectors comprises two sets of said sectors of differing arcuate lengths alternately disposed about said shaft, and said sector support and displacing means comprises two spaced hubs slidably mounted on said shaft, link means for pivotally connecting each of said sectors to said hubs, the distance between the pivot points of the link means associated with the set of sectors of greater arcuate length being greater than the distance between the pivot points of the link means associated with the set of sectors of lesser arcuate length, said means for displacing the sector support and displacing means being adapted to slide said hubs symmetrically and simultaneously in opposite directions with respect to the drum midline and within the operative plane of the drum to effect corresponding radial movement of said sectors.

4. A drum assembly as in claim 3, wherein said means for displacing said sector support and displacing means comprises a hollow mandrel slidably mounted inside said axial shaft, a displacement shaft slidably mounted inside said mandrel, and connecting means slidable in a slit formed in said axial shaft and adapted to connect one end of said mandrel and said displacement shaft to a corresponding hub.

5. A drum assembly as in claim 4, wherein said means for displacing said sector supporting and displacing means further comprises a pair of lever means, piston means connected to one end of each of said lever means for reciprocating same, the first of said lever means being pivotal about its other end, and the other end of said lever means being pivotal about an intermediate point thereof, said first lever means being provided with two slits into which the other end of said mandrel is slidably assembled in a manner to permit free rotation of said mandrel about its own axis, the other end of said other lever means being provided with two slits into which the other end of said displacement shaft is slidably assembled in a manner to permit free rotation of said displacement shaft about its own axis.

6. A drum assembly as in claim 5, wherein each of said lever means is formed by two lever members fixed to each other by means of a stiffening plate.

7. A drum assembly as in claim 3, wherein said means for engaging said seats comprises at least an annular wedge of predetermined diameter.

8. A drum assembly as in claim 7, wherein there are two of said annular wedges symmetrically disposed with respect to the drum midline and directed towards the latter.

9. A drum assembly as in claim 8, wherein said annular wedges are integral with said hubs.

10. A drum assembly as in claim 3, wherein the distance between the pivot points of the link means associated with the set of levers of greater arcuate length and the distance between the pivot points of the link means associated with the set of levers of lesser arcuate length are proportionate with the arcuate length of said sets of sectors, so that the outer surface of the drum remains continuous both in the radially outermost position of said sectors and in the radially innermost position thereof.

11. A rigid collapsible drum assembly comprising a shaft, a plurality of sector assemblies mounted about said shaft, means to displace said sector assemblies radially toward and away from said shaft and within the operative plane of the drum, the sectors of said assemblies being arcuate shaped and forming a continuous surface in their outermost and innermost radial positions, and means carried by said shaft for engaging and retaining said sectors in said outermost radial position in response to the outward radial displacement of said assemblies, wherein said sector assemblies comprise two equal groups, the sectors in one group being of a greater arcuate length than the sectors in the other group, and wherein said means to displace said sectors is adapted to displace said sectors of greater length a smaller distance inwardly than said sectors of lesser length so that said sectors of greater length form a continuous surface when both groups of sectors are in their innermost radial position.

References Cited

UNITED STATES PATENTS

| | | | |
|---|---|---|---|
| 2,123,586 | 7/1938 | Heston | 156—418 |
| 2,132,834 | 10/1938 | Stevens et al. | 156—420 |
| 2,149,604 | 3/1939 | Johnson | 156—419 |
| 3,467,567 | 9/1969 | Woodhall | 156—416X |

SAMUEL W. ENGLE, Primary Examiner

S. C. BENTLEY, Assistant Examiner